United States Patent
Nishiji

[11] Patent Number: 5,971,882
[45] Date of Patent: Oct. 26, 1999

[54] PARALLEL-AXIS GEAR DIFFERENTIAL

[75] Inventor: Makoto Nishiji, La Louviere, Belgium

[73] Assignee: Zexel Corporation, Tokyo, Japan

[21] Appl. No.: 09/019,607

[22] Filed: Feb. 6, 1998

[30] Foreign Application Priority Data

Feb. 14, 1997 [JP] Japan .................................. 9-047170

[51] Int. Cl.[6] .................................................. F16H 1/38
[52] U.S. Cl. .................................................. 475/252
[58] Field of Search ........................................... 475/252

[56] References Cited

U.S. PATENT DOCUMENTS

| | | | |
|---|---|---|---|
| 1,454,578 | 5/1923 | Towler | 475/252 |
| 3,406,593 | 10/1968 | Vesey | 475/252 |
| 3,738,192 | 6/1973 | Belansky | 475/252 |
| 5,147,252 | 9/1992 | Mace et al. | 475/252 |

FOREIGN PATENT DOCUMENTS

| | | |
|---|---|---|
| WO 93/02300 | 2/1993 | WIPO . |
| WO 93/02301 | 2/1993 | WIPO . |

*Primary Examiner*—Dirk Wright

[57] ABSTRACT

At least one pair of first pockets (12A, 12D) are formed in the inner peripheral surface of a housing (1). The first pockets (12A, 12D) are arranged away from each other in a circumferential direction of the housing (1). Planetary gears (3A, 3B) meshed with one pair of side gears (2A, 2B) are rotatably received in the first pockets (12A, 12D), respectively. Second pockets 12B, 12C are formed in the inner peripheral surface of the housing (1) between the first pockets (12A, 12D). Transfer gears (4A, 4B) are rotatably received respectively in the second pockets (12B, 12C). The transfer gears (4A, 4B) are in meshing engagement with the planetary gears (3A, 3B) respectively, and also in meshing engagement with each other.

16 Claims, 10 Drawing Sheets

(A)

(B)

PARALLEL-AXIS GEAR DIFFERENTIAL

TECHNICAL FIELD

This invention relates to a parallel-axis gear differential having planetary gear arranged parallel to an axis of rotation of a housing.

BACKGROUND OF THE INVENTION

In general, parallel-axis gear differentials comprise, as disclosed in International Publication No. WO93/02300 and WO93/02301, a housing driven for rotation, one pair of side gears rotationally arranged within the housing on an axis of rotation thereof, and at least one pair of planet gears arranged within the housing in parallel relation with the axis of rotation thereof. The planetary gears of each pair are in meshing engagement with each other and also meshed with the respective side gears.

The one pair of planetary gears are rotatably received respectively in pockets formed in the housing. By utilizing a frictional resistance generated between an outer peripheral surface of each planetary gear and an inner peripheral surface of each pocket, a driving torque transmitted to the housing is distributed to the one pair of side gears in accordance with a prescribed torque bias (hereinafter referred to as the "TBR"). Factors for determining the largeness of the TBR include a frictional resistance between the housing and an end face of each side gear, a frictional resistance between the end faces of adjacent side gears, a frictional resistance between teeth of the gears which are in meshing engagement with each other, and the like. A frictional resistance between an outer peripheral surface of each planetary gear and an inner peripheral surface of the pocket is one main factor for determining the largeness of the TBR.

In the above conventional parallel-axis gear differential, there is involved such a problem that a large TBR is unobtainable.

That is, as shown in FIG. 16, presuming that the housing is driven for rotation in a direction as indicated by an arrow, thrust forces F1, F2 attributable to the meshing engagement between the side gears S1, S2 and the planetary gears P1, P2, and between the planetary gears P1 and P2 are acted on the planetary gears P1, P2. The thrust forces F1, F2 cause the planetary gears P1, P2 to be urged against inner peripheral surface of each pocket (not shown) to thereby generate a frictional resistance between the outer peripheral surfaces of the planetary gears P1, P2 and the inner peripheral surfaces of the pockets. Accordingly, in order to obtain a large TBR, it is necessary to increase the thrust forces F1, F2.

The thrust force F1 is a sum of vectors of meshing engagement reaction forces Fs1, Fp1 acting between the planetary gear P1 and the side gear S1, and between the planetary gear P1 and the planetary gear P2, while the thrust force F2 is a sum of vectors of meshing engagement reaction forces Fs2, Fp2 acting between the planetary gear P2 and the side gear S2, and between the planetary gear P2 and the planetary gear P1. In this case, the thrust force F1 acting on the planetary gear P1 becomes large because the meshing engagement reaction forces Fs1, Fp1 are oriented generally in the same direction, but the thrust force F2 acting on the planetary gear P2 is very small compared with the thrust force F1 because the meshing engagement reaction forces Fs2, Fps are oriented generally in opposite directions. Accordingly, it is only one of the paired planetary gears P1, P2 that contributes the TBR. For this reason, there is involved in the conventional parallel-axis gear differential that a large TBR is unobtainable.

If a number, n (n≧2) pairs, of the planetary gears P1, P2 should be provided, it would be possible to increase the number of the planetary gears P1, P2 which can contribute to the TBR compared with the case where only one pair of the planetary gears Pa, P2 are provided. However, if a number, n pairs of the planetary gears P1, P2 should be provided, the thrust forces acting on the respective planetary gears P1, P2 become 1/n compared with the case where only one pair of the planetary gears P1, P2 are provided. Accordingly, the TBR can not be increased.

SUMMARY OF THE INVENTION

According to the present invention, there is essentially provided a parallel-axis gear differential comprising:

a sleeve-like housing driven for rotation about an axis of rotation thereof;

one pair of side gears rotatably supported within the housing with a common axis thereof aligned with the axis of ration;

at least one pair of planetary gears rotatably received in two first pockets formed within the housing in parallel with the axis of rotation and away from each other in a circumferential direction of the housing and meshed with the one pair of side gears, respectively;

an even number of transfer gears rotatably received respectively in second pockets formed within the housing between the first pockets in parallel with the axis of rotation, the plurality of transfer gears constituting a gear train for interconnecting the one pair of planetary gears.

BRIEF DESCRIPTION OF THE DRAWINGS

FIG. 1(A) is a sectional view taken on line A—A of FIG. 1(B), and FIG. 1(B) is a sectional view taken on line B—B of FIG. 1(A);

DETAILED DESCRIPTION OF THE EMBODIMENTS

Embodiments of the present invention will now be described with reference to FIGS. 1 through 15.

Figure 1:
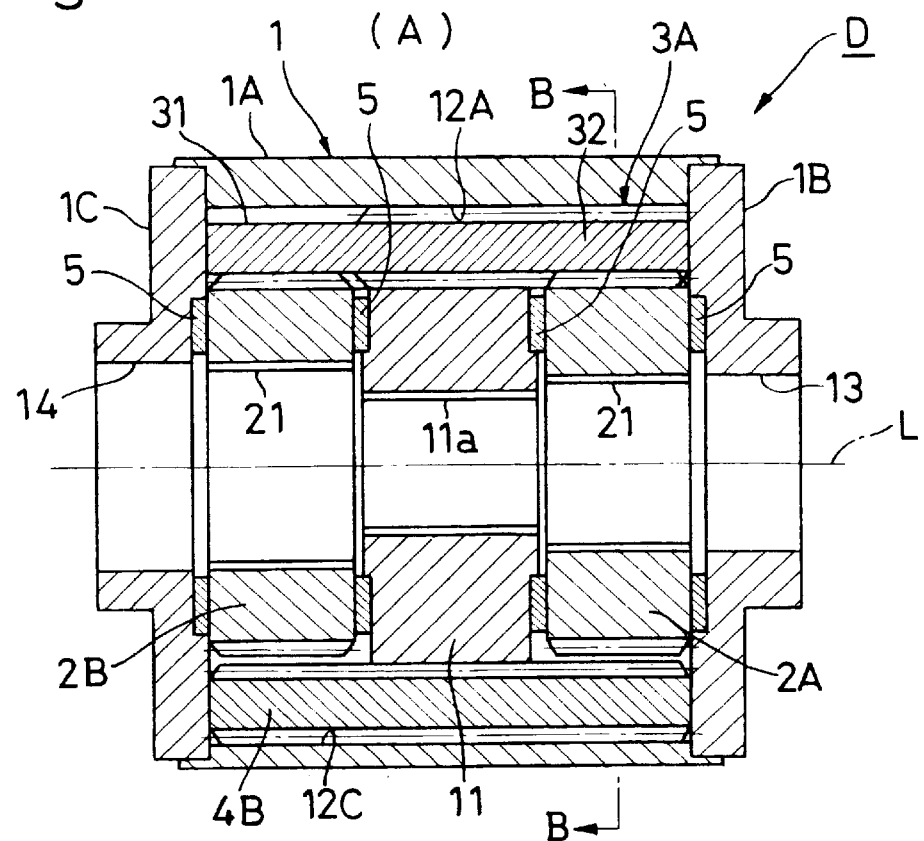
FIGS. 1(A)–1(B) are views showing the first embodiment of the present invention.
Figure 1:
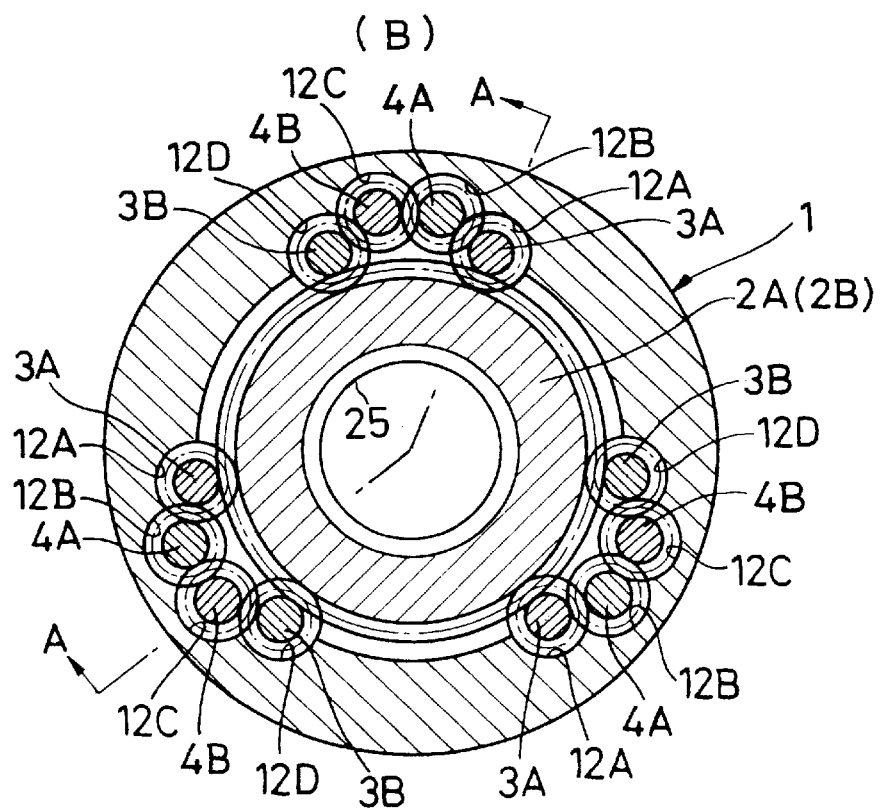
Figure 2:
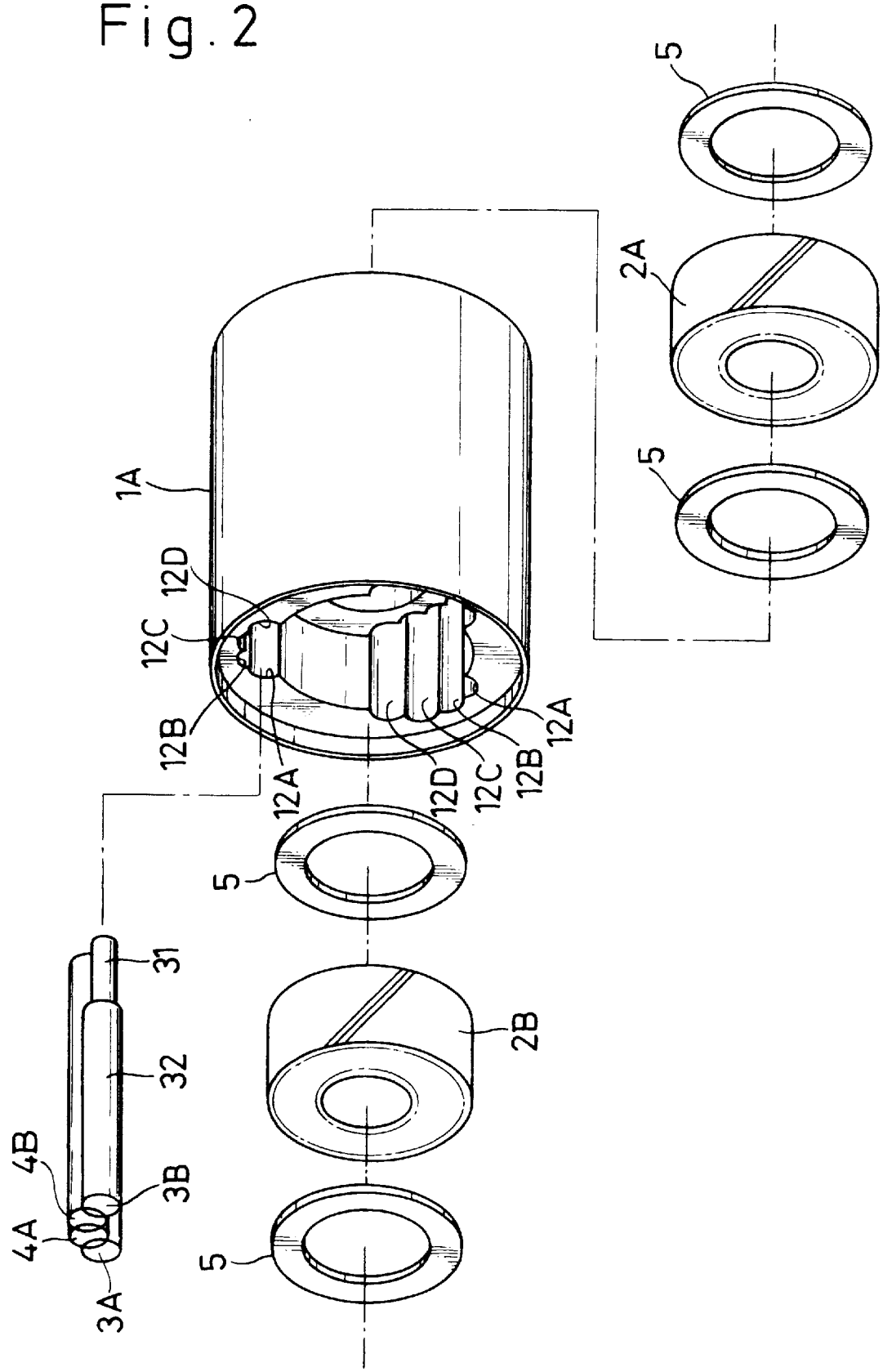
FIG. 2 is an exploded perspective view of the first embodiment.

Referring first to FIGS. 1 through 7, the first embodiment of the present invention will be described. A gear differential arrangement D according to the first embodiment is suited to be used as an automobile differential. As shown in FIGS. 1 and 2, the gear differential arrangement D comprises, as main component elements, a housing 1, one pair of side gears 2A, 2B, three pairs of planetary gears 3A, 3B, and three pairs of transfer gears 4A, 4B.

As shown in FIG. 1, the housing 1 comprises a cylindrical body 1A opposite ends of which are open, and closure members 1B, 1C for closing the opposite end opening portions of the body 1A, respectively.

As shown in FIGS. 1, 2, and 4 through 6, a partition portion 11 is formed on a central portion of an inner peripheral surface of the body 1A. A hole 11a is formed in a central portion of the partition portion 11. The hole 11a is unrotatably connected with a drive shaft (not shown) connected to an engine (not shown) through a spline connection or other means. The housing 1 is driven for rotation about an axis L of rotation by the drive shaft.

Three sets of pockets, each set consisting of four pockets 12A, 12B, 12C, and 12D, are formed in the inner peripheral surface of the body 1A. The three sets of pockets 12A through 12D are equally spacedly arranged in a circumferential direction of the body 1A. The respective pockets 12A through 12D extend from one end of the body 1A to the other end thereof in parallel with the axis L of rotation. The pockets (first pockets) 12A, 12D and the pockets (second pockets) 12B, 12C are arranged respectively on two circumferences about the axis L of rotation. The circle on which the pockets 12B, 12C are arranged is larger in diameter than the circle on which the pockets 12A, 12D are arranged. Accordingly, the pockets 12B, 12C are located outwardly of the pockets 12A, 12B.

The one pair of side gears 2A, 2B are arranged respectively on one and the other end sides within the body 1A with their common axis aligned with the axis L of rotation. Through-holes 21, 21 are formed respectively in the central portions of the respective side gears 2A, 2B. Inner end portions of output shafts (not shown) rotatably pierced into bearing holes 13, 13 of the closure members 1B, 1C are unrotatably connected respectively to the through-holes 21, 21 by spline connection or other suitable means. Accordingly, the side gears 2A, 2B are rotatably supported by the housing 1 through the output shafts. At least one of the output shafts connected respectively to the side gears 2A, 2B is of a sleeve-like configuration, into which the drive shaft is relatively rotatably pierced.

Friction washers 5 are respectively arranged between the side gear 2A and the closure member 1B, between the side gear 2A and the partition portion 11, between the side gear 2B and the closure member 1C, and between the side gear 2B and the partition portion 11. When the side gears 2A, 2B are rotated relative to the housing 1, a frictional resistance against the relative rotation is generated between the respective friction washers 5 and the side gears 2A, 2B. This frictional resistance is one of the factors for determining the largeness of the TBR.

Figure 3:
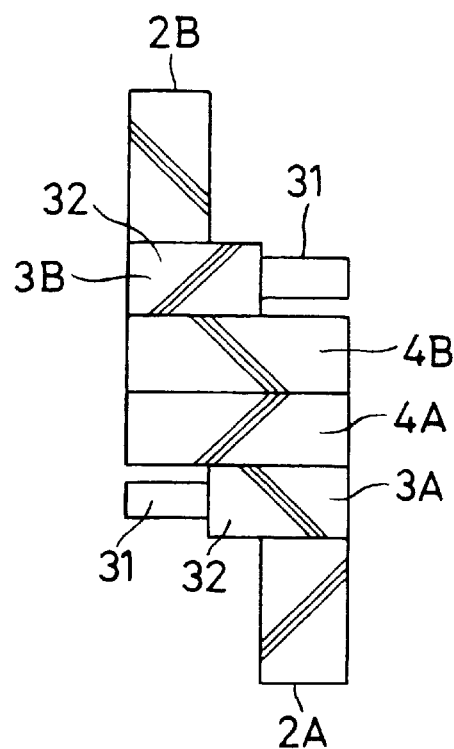
FIG. 3 is an development view showing a gear train from one side gear to the other side gear in the first embodiment.
Figure 4:
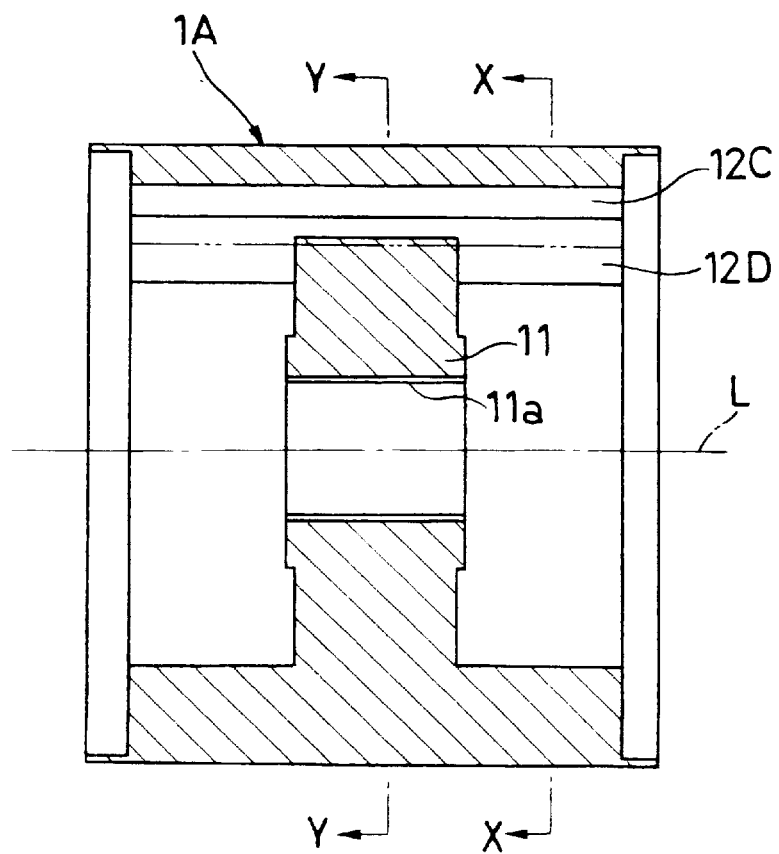
FIG. 4 is a view showing a housing of the first embodiment and a sectional view taken on line Z—Z of FIG. 5.
Figure 5:
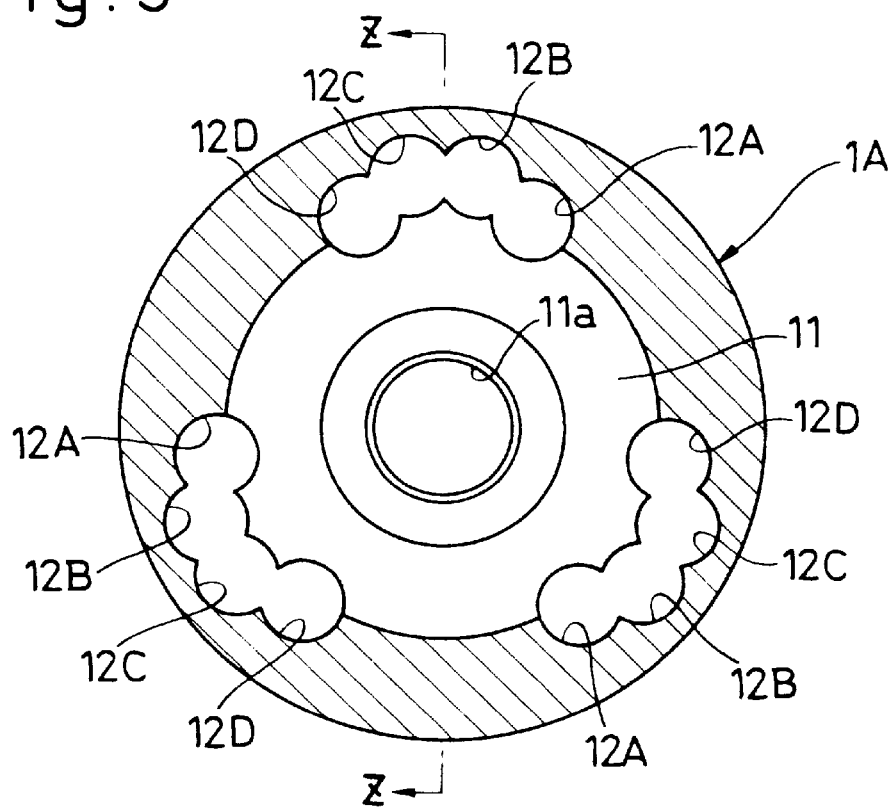
FIG. 5 is a sectional view taken on line X—X of FIG. 4.
Figure 6:
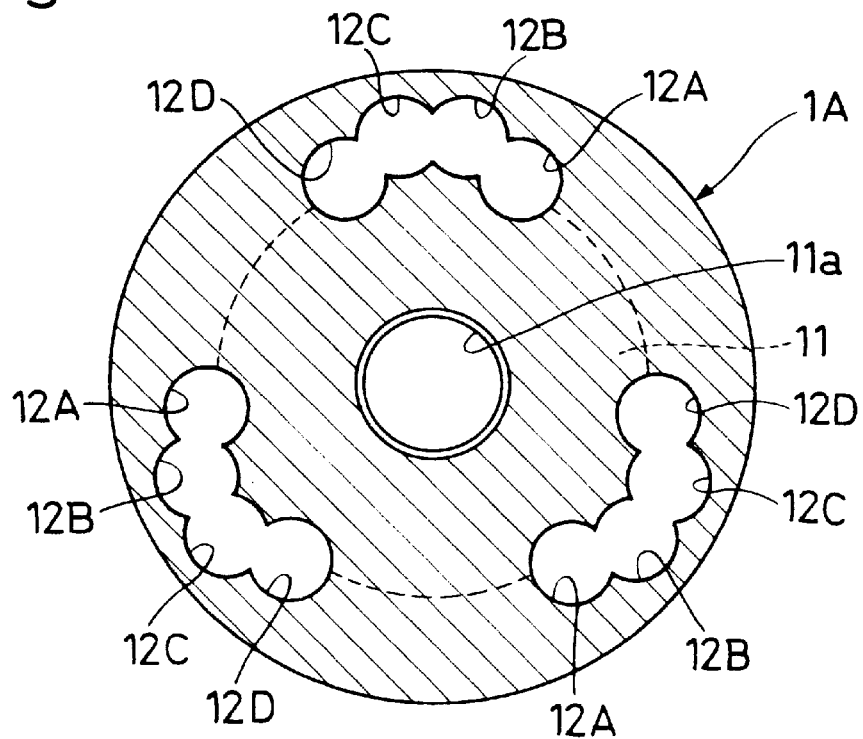
FIG. 6 is a sectional view taken on line Y—Y of FIG. 4.

The planetary gears 3A, 3B each have the generally same length as the body 1A. The planetary gears 3A, 3B are each provided on one end portions thereof with a reduced diameter portion 31 and on the remaining portions with a gear portion 32. The reduced diameter portion 31 is slightly longer than the side gears 2A, 2B and equal to or slightly smaller in diameter than a bottom circle of teeth of the gear portion 32. The outside diameter of the gear portion 32 is generally equal to the inside diameters of the pockets 12A, 12B. The planetary gears 3A, 3B are inserted respectively into the pockets 12A, 12B with the reduced diameter portions 31, 31 located on the side rears 2B, 2A side. In this case, since the outside diameter of the gear portion 31 is generally equal to the inside diameters of the pockets 12A, 12B, the planetary gears 3A, 3B are rotatable (about their own axes) within the pockets 12A, 12B, respectively and rotated (about the axis L of rotation) together with the housing 1 as one body. Moreover, as shown in FIG. 3, the planetary gears 3A, 3B are in meshing engagement respectively with the side gears 2A, 2B at outer end portions of the gear portions 32, 32.

The transfer gears 4A, 4B have the same outside diameters as the inside diameters of the pockets 12B, 12C, and have the generally same length as the body 1A. The transfer gears 4A, 4B are rotatably inserted respectively into the pockets 12B, 12C. Teeth are formed over the entire outer periphery of the transfer gears 4A, 4B. The transfer gear 4A is in meshing engagement with the planetary gear 3A at a crossing area between the pocket 12A and the pocket 12B, while the other transfer gear 4B is in meshing engagement with the planetary gear 3B at a crossing area between the pocket 12C and the pocket 12D. Moreover, the transfer gears 4A, 4B are in meshing engagement with each other at a crossing area between the pocket 12B and the pocket 12C. Accordingly, the side gears 2A, 2B are connected together through a gear train consisting of the planetary gear 3A, the transfer gear 4A, the transfer gear 4B, and the planetary gear 3B.

In the gear differential arrangement D thus constructed, the transfer gears 4A, 4B are arranged between the planetary gear 3A and the planetary gear 3B, but those transfer gears 4A, 4B merely transfer the rotation of the planetary gears 3A, 3B. Moreover, since two transfer gears 4A, 4B are arranged, the direction of rotation of the planetary gears 3A, 3B is the same as in the case where no transfer gears 4A, 4B are employed. Accordingly, the function relating to the differential rotation of the gear differential arrangement D is the same as the conventional gear differential arrangement described in the above Publication. Therefore, description of the differential rotation of the gear differential arrangement D is omitted.

However, the function for limiting the differentiation of the gear differential arrangement D is greatly different from the conventional gear differential arrangement.

Figure 7:
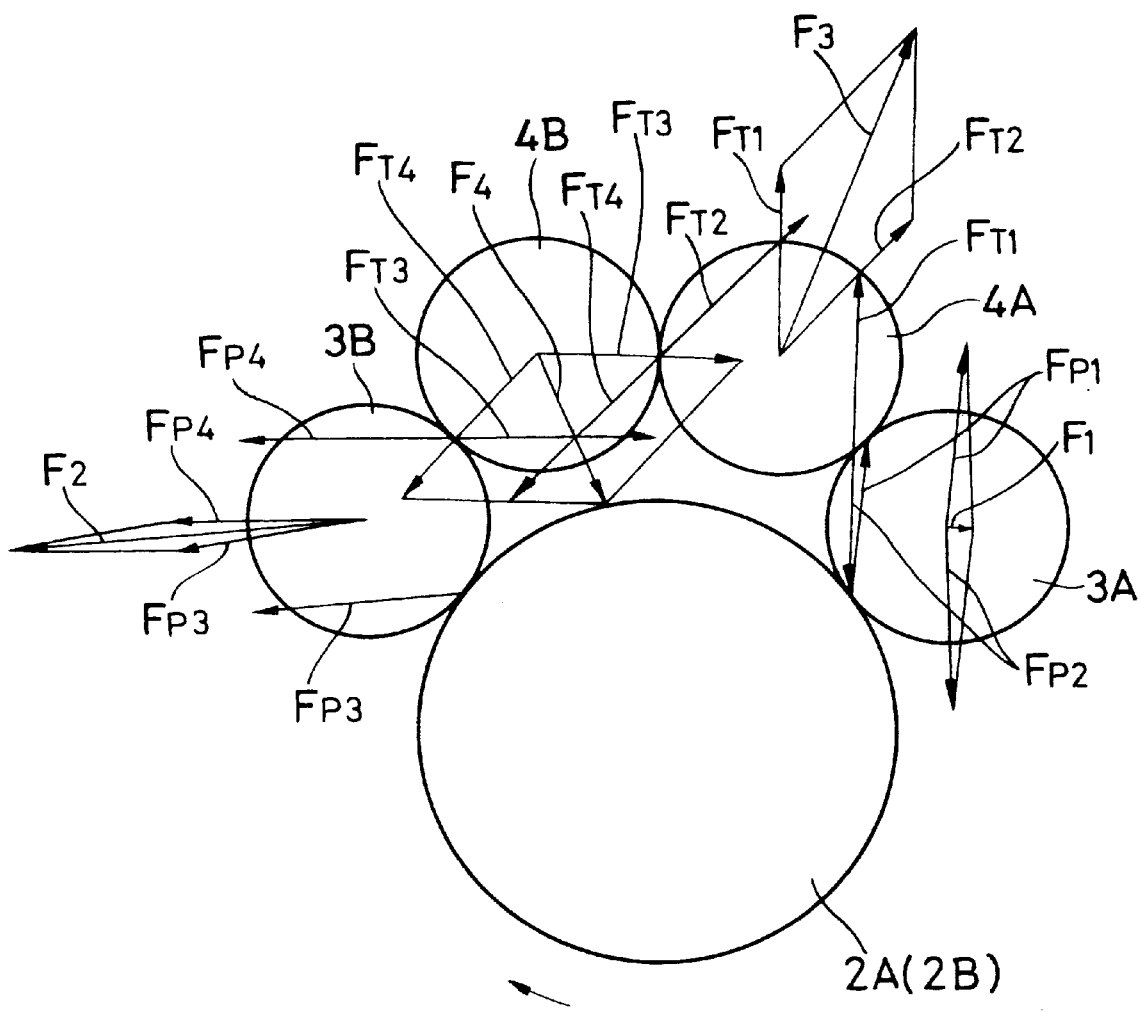
FIG. 7 is a representation showing meshing engagement reaction forces and thrust forces acting on planetary gears and transfer gears in the first embodiment.

That is, presume that the housing 1 is driven for rotation in a direction as indicated by an arrow of FIG. 7. Meshing engagement reaction forces Fp1, Fp2 attributable to the meshing engagement between the planetary gear 3A and the side gear 2A and between the planetary gear 3A and the transfer gear 4A act on the planetary gear 3A. Similarly, meshing engagement reaction forces Fp3, Fp4 attributable to the meshing engagement between the planetary gear 3B and the side gear 2B and between the planetary gear 3B and the transfer gear 4B act on the planetary gear 3B. Similarly, meshing engagement reaction forces FT1, FT2 attributable to the meshing engagement between the transfer gear 4A and the planetary gear 3A and between the transfer gear 4A and the transfer gear 4B act on the transfer gear 4A. Similarly, meshing engagement reaction forces FT3, FT4 attributable to the meshing engagement between the transfer gear 4B and the planetary gear 3B and between the transfer gear 4B and the transfer gear 4A act on the transfer gear 4B. Then, thrust forces F1 through F4 as a combined force of the respective meshing engagement reaction forces act respectively on the planetary gears 3A, 3B, and the transfer gears 4A, 4B. By the thrust forces F1 through F4, the planetary gears 3A, 3B and the transfer gears 4A, 4B are thrust contacted respectively with the inner peripheral surfaces of the pockets 12A, 12D, 12B, and 12C. Accordingly, when the housing 1 is driven for rotation, a frictional resistance as a primary factor for determining the largeness of the TBR is generated between the outer peripheral surfaces of the respective gears 3A, 3B, 4A, and 4B and the inner peripheral surfaces of the pockets 12A through 12D.

Although the thrust forces F1 acting on the planetary gear 3A is small because the meshing engagement forces FP1, FP2 are oriented generally in the opposite directions, the thrust forces F2, F3 acting respectively on the planetary gear 3B and the transfer gear 4A become large because the reaction forces acting on them respectively are oriented generally in the same direction. Although the thrust force F3 acting on the transfer gear 4B is not so large as the thrust forces F2, F3, it is larger than the thrust force F1. In this way, the large thrust forces F2 through F4 are acted on the planetary gear 3B and the transfer gears 4A, 4B in this gear differential arrangement D. Accordingly, the TBR can be extensively increased compared with the conventional gear differential arrangement in which a large thrust force acts only on a single planetary gear.

In case the housing 1 is rotated in the reversed direction to the direction as indicated by the arrow, the thrust forces F2, F1 act respectively on the planetary gears 3A, 3B and the thrust forces F4, F3 act respectively on the transfer gears 4A, 4B. Accordingly, the TBR can also be increased in this case.

Next, other embodiments of the present invention will be described. In the embodiments to be described hereinafter, only those component parts which are different from the above embodiment are described, identical component parts are denoted by identical reference numeral, and description thereof is omitted.

Figure 8:
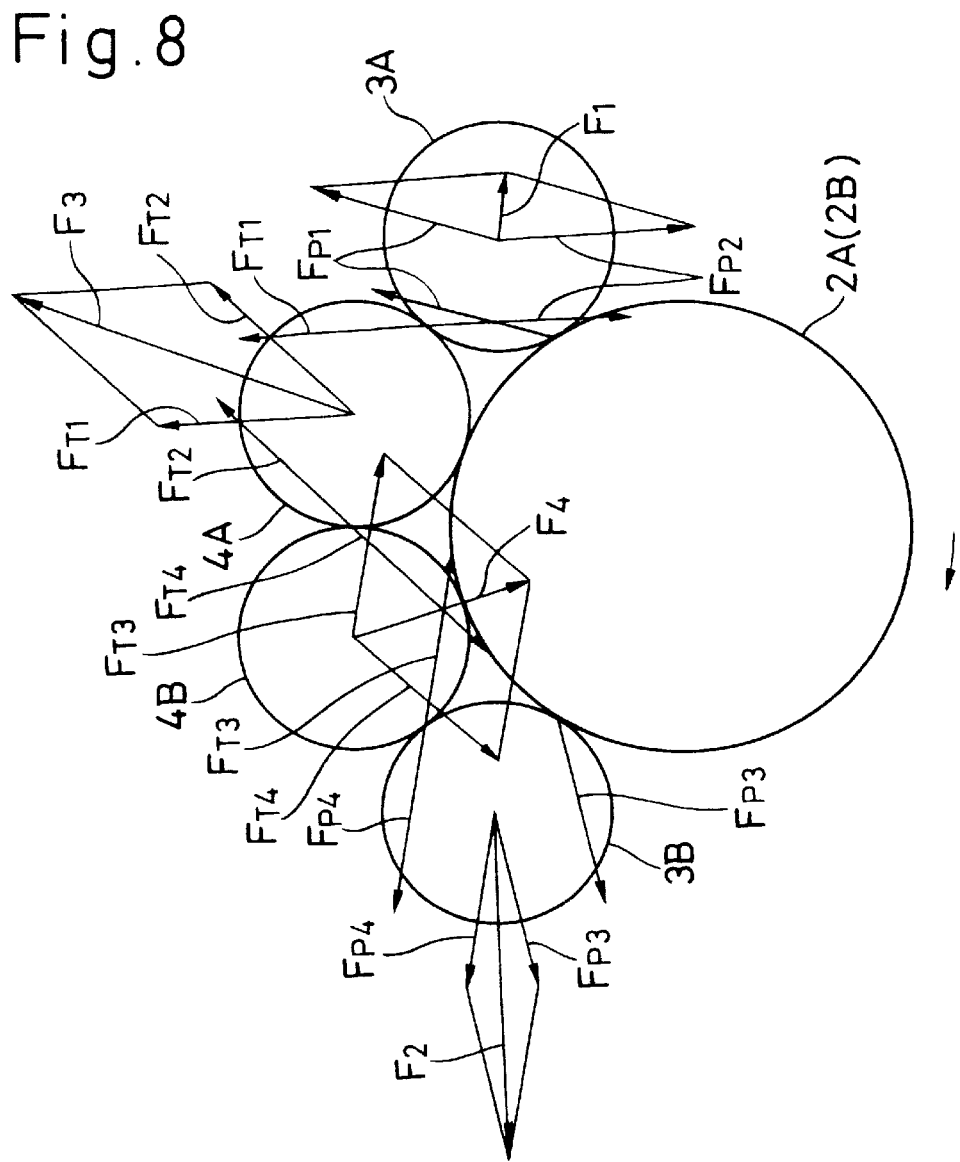
FIG. 8 is a view similar to FIG. 7, showing the second embodiment of the present invention.
Figure 9:
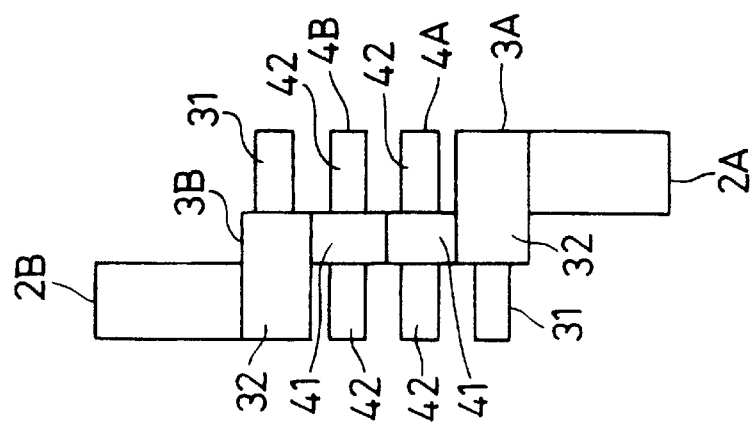
FIG. 9 is a development view similar to FIG. 3, showing the second embodiment.

FIGS. 8 and 9 show the second embodiment of the present invention. In this embodiment, the transfer gears 4A, 4B are arranged on the same circumference as the planetary gears 3A, 3B. With this arrangement, if the gear portion is formed over the entire length of the transfer gears 4A, 4B, opposite end portions interfere the side gears 2A, 2B. In order to avoid such inconveniences, the gear portions 41 are formed only on the central portions of the transfer gears 4A, 4B, respectively, and reduced diameter portions 42 having a diameter equal to or less than the diameter of the tooth bottom portion 41 are each formed on the opposite end portions.

Figure 10:
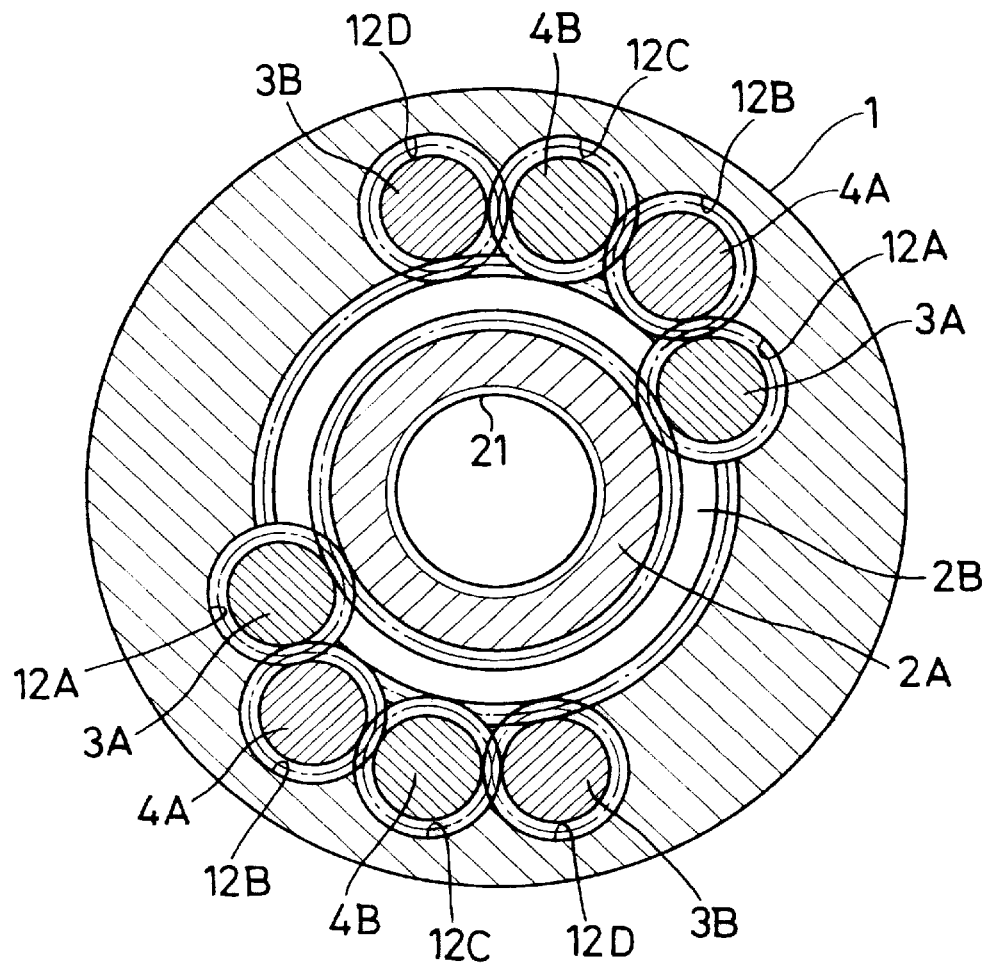
FIG. 10 is a sectional view similar to FIG. 1(B), showing the third embodiment of the present invention.
Figure 11:
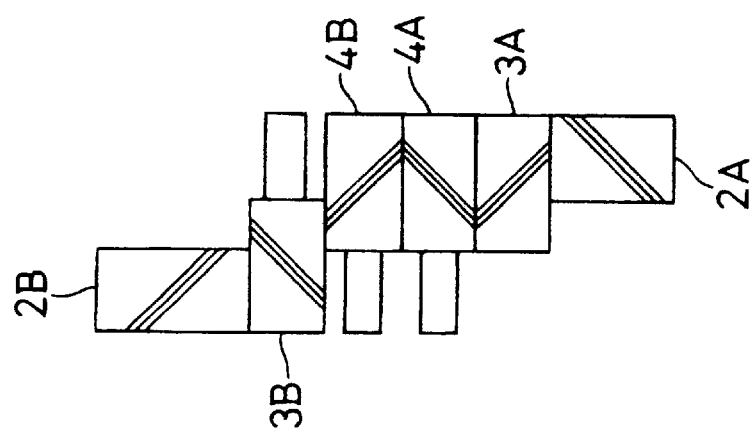
FIG. 11 is a development view similar to FIG. 3, showing the third embodiment.

FIGS. 10 and 11 show the third embodiment of the present invention. In this embodiment, the side gear 2A is smaller in diameter than the side gear 2B in order to make the torque transmitted from the housing 1 to the side gear 2A smaller than the torque transmitted from the housing 1 to the side gear 2B. In correspondence with this, the planetary gear 3A is situated on a smaller circumference than the planetary gear 3B. The transfer gears 4A, 4B are arranged on the same circumference on which the planetary gear 3B is arranged as in the second embodiment.

Contrary to this embodiment, the side gear 2B may be formed smaller in diameter than the side gear 2A. If that is the case, the torque transmitted from the housing 1 to be side gear 2B can be made smaller than the torque transmitted from the housing 1 t the side gear 2A.

In this way, since the torque transmitted to the side gears 2A, 2B can be different in magnitude in the gear differential arrangement including the side gears 2A, 2B having different outside diameters, driving forces of different magnitudes can be transmitted, when applied to the center differential, to the front and rear wheels.

Figure 12:
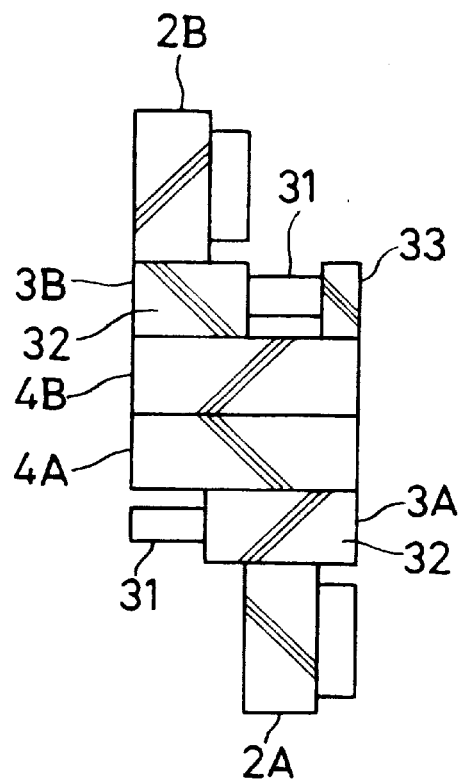
FIG. 12 is a development view similar to FIG. 3, showing the fourth embodiment of the present invention.

FIG. 12 shows the fourth embodiment of the present invention. In this embodiment, a short gear portion 33 is formed on an outer end portion of the reduced diameter portion 31 of the planetary gear 3B. This short gear portion 33 is also in meshing engagement with the transfer gear 4B. The two gear portions 32, 33 straddle the side gear 2A which is in meshing engagement with the planetary gear 3A. The short gear portion 33 may be formed on the planetary gear 3A instead on the planetary gear 3B.

With the construction in which the gear portions 32, 33 straddle the side gear 2A and are in meshing engagement with the transfer gear 4B, a moment attributable to the meshing engagement between the gear portion 33 and the transfer gear 4B and a moment attributable to the meshing engagement between the gear portion 33 and the transfer gear 4B are offset each other. Accordingly, it can be prevented that large moments act on the planetary gear 3B and the transfer gear 4B, respectively.

Figure 13:
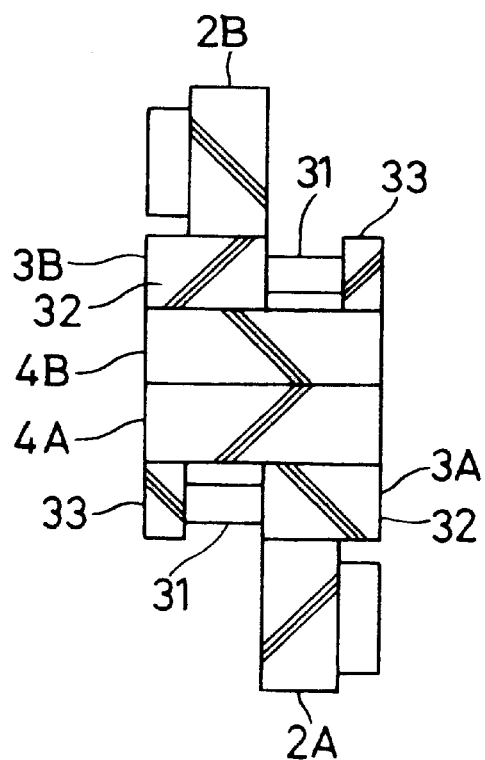
FIG. 13 is a development view similar to FIG. 3, showing the fifth embodiment of the present invention.

FIG. 13 shows the fifth embodiment of the present invention. In this embodiment, the short gear portions 33, 33 are formed on the reduced diameter portions 31, 31 of the planetary gears 3A, 3B, respectively. The respective short gear portions 33, 33 are in meshing engagement with the transfer gears 4A, 4B. The gear portions 32, 33 of the planetary gear 3A straddle the side gear 2B which is in meshing engagement with the planetary gear 3B, while the gear portions 32, 33 of the planetary gear 3B straddle the side gear 2A which is in meshing engagement with the planetary gear 3A.

Figure 14:
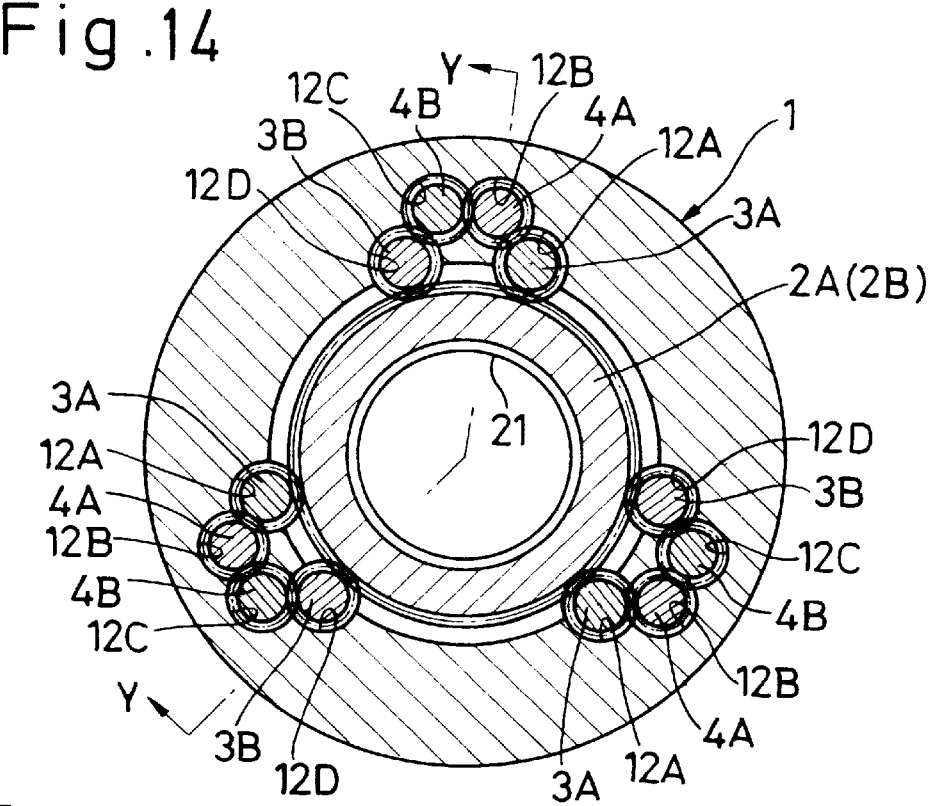
FIG. 14 is a view showing the sixth embodiment of the present invention, and a sectional view taken on line X—X of FIG. 15.
Figure 15:
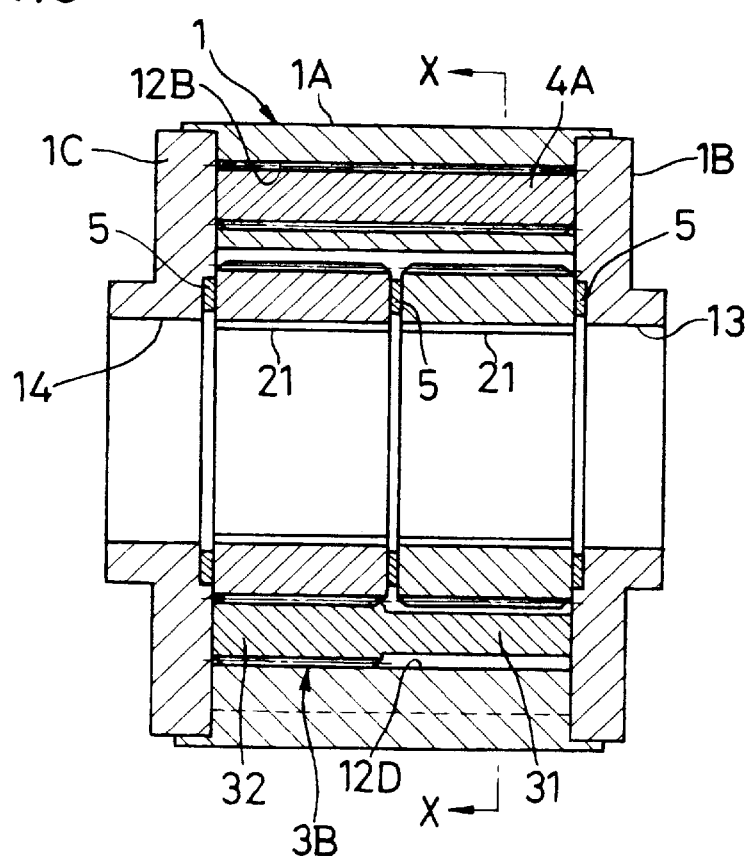
FIG. 15 is a sectional view taken on line Y—Y of FIG. 14.
Figure 16:
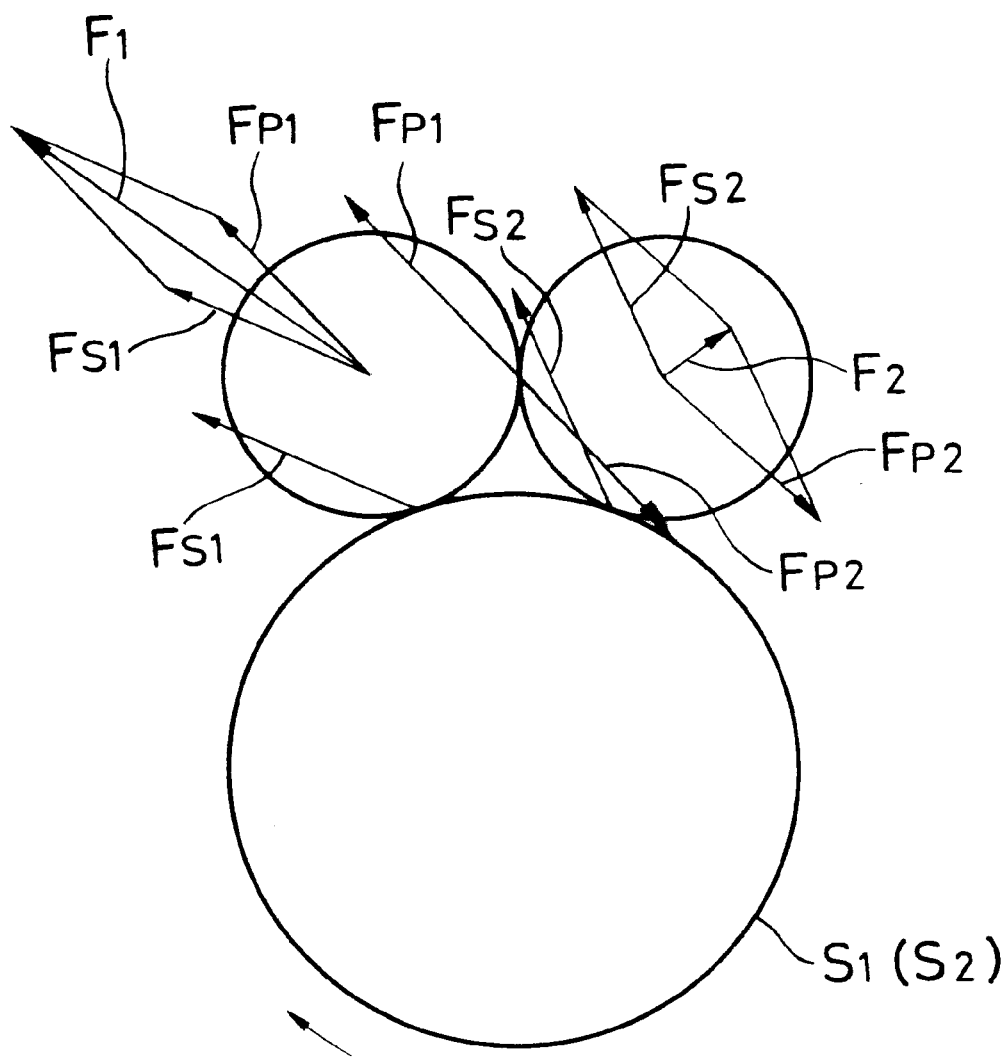
FIG. 16 is a representation showing meshing engagement reaction forces and thrust forces acting on one pair of planetary gears of the conventional parallel-axis gear differential.

FIGS. 14 and 15 shows the sixth embodiment of the present invention. In this embodiment, the pockets 12B, 12C are arranged outwardly of the inner peripheral surface of the housing 1 and are in the form of a sectionally circular hole as a whole. Owing to this feature, the TBR can be much more increased.

That is, as shown in FIG. 7, when the housing 1 is rotated in a direction as indicated by an arrow, a thrust force F4 orienting towards the inner periphery of the housing 1 acts on the transfer gear 4B. For this reason, in case the pocket 12C is formed in the inner peripheral surface of the housing 1 and the inner side portion of the pocket 12C is open as in the first embodiment, the transfer gear 4B contacts only an area of the pocket 1 corresponding to the partition portion 11. On the other hand, in case the pocket 12C is in the form of a hole, the transfer gear 4B contacts the pocket 12C over an entire length thereof. Accordingly, a frictional resistance generated between the transfer gear 4B and the pocket 12C can be increased. By this, the TBR can be increased. This is likewise applicable to the case where the housing 1 is rotated in the reversed direction to the direction as indicated by an arrow of FIG. 7. In that case, the frictional resistance between the transfer gear 4A and the pocket 12B can be increased. Moreover, since there is no need of a provision of the partition portion 11 in this embodiment, the housing 1 can be reduced in its entire length to the extent of the partition portion 11. By this, the gear differential arrangement can be reduced in length.

The present invention is not limited to the above embodiments and can be changed in design in accordance with necessity.

For example, although the gear differential arrangement of the present invention is applied to a center differential in the above embodiments, it may likewise be applied to a front or a rear differential.

Although two transfer gears 4A, 4B are provided between one pair of planetary gears 4A and 4B, four transfer gears may be provided therebetween.

As the side gears 2A, 2B, the planetary gears 3A, 3B and the transfer gears 4A, 4B, there may be employed helical gears, or spur gears.

The planetary gears 3A, 3B may be the same or different in number of teeth from the transfer gears 4A, 4B.

The transfer gears 4A, 4B may be located offset towards the inner periphery side of the housing 1 rather than the planetary gears 3A, 3B.

What is claimed is:

1. A parallel-axis gear differential comprising:
   a sleeve-like housing driven for rotation about an axis of rotation thereof;
   one pair of side gears rotatable supported within said housing with a common axis thereof aligned with said axis of rotation;
   at least one pair of Planetary gears rotatable received in two first pockets formed within said housing in parallel with said axis of rotation and separated from each other in a circumferential direction of said housing and meshed with said one pair of side gears, respectively; and
   an even number of transfer gears rotatable received respectively in second pockets formed within said housing between said first pockets in parallel with said axis of rotation, said transfer gears constituting a gear train for interconnecting said one pair of planetary gears,
   wherein said first and second pockets are formed in an inner peripheral surface of said housing, and a partition portion for dividing the interior of said housing into one end side and the other end side is formed within said housing at an intermediate portion thereof in a direction of said axis of rotation, and portions of said first and second pockets corresponding to said partition portion are formed as holes, respectively.

2. A parallel-axis gear differential according to claim 1, wherein said one pair of side gears are formed as the same gears.

3. A parallel-axis gear differential according to claim 1, wherein said one pair of planetary gears and said even number of transfer gears are arranged on a same circumference.

4. A parallel-axis gear differential according to claim 1, wherein said one pair of planetary gears are arranged on a same circumference, and said even number of transfer gears are on a same circumference having a larger diameter than the circle on which said one pair of planetary gears are arranged.

5. A parallel-axis gear differential according to claim 1, wherein at least one of said one pair of planet gears is provided on opposite end portions thereof with gear portions straddling a side gear with which the other planetary gear is in meshing engagement, a gear portion on one end portion of said at least one planetary gear is in meshing engagement with said side gear and said transfer gear, and the other gear portion is in meshing engagement with said transfer gear.

6. A parallel-axis gear differential according to claim 5, wherein said one pair of planetary gears and said even number of transfer gears are arranged on a same circumference.

7. A parallel-axis gear differential according to claim 5, wherein said one pair of planetary gears are arranged on a same circumference, and said even number of transfer gears are arranged on a same circumference having a larger diameter than a circle on which said one pair of planetary gears are arranged.

8. A parallel-axis gear differential comprising:
   a sleeve-like housing driven for rotation about an axis of rotation thereof;
   one pair of side gears rotatable supported within said housing with a common axis thereof aligned with said axis of rotation;
   at least one pair of planetary gears rotatable received in two first pockets formed within said housing in parallel with said axis of rotation and separated from each other in a circumferential direction of said housing and meshed with said one pair of side gears, respectively; and
   an even number of transfer gears rotatable received respectively in second pockets formed within said housing between said first pockets in parallel with said axis of rotation, said transfer gears constituting a gear train for interconnecting said one pair of planetary gears,
   wherein said one pair of side gears are formed as the same gears and said one pair of planetary gears are arranged on a same circumference, said even number of transfer gears are on a same circumference having a larger diameter than the circle on which said one pair of planetary gears are arranged, and said first pockets are formed in the inner surface of said housing, and said second pockets are formed as a hole within said housing.

9. A parallel-axis gear differential comprising:
   a sleeve-like housing driven for rotation about an axis of rotation thereof;
   one pair of side gears rotatable supported within said housing with a common axis thereof aligned with said axis of rotation;
   at least one pair of planetary gears rotatable received in two first pockets formed within said housing in parallel with said axis of rotation and separated from each other in a circumferential direction of said housing and meshed with said one pair of side gears, respectively; and
   an even number of transfer gears rotatable received respectively in second Pockets formed within said housing between said first pockets in parallel with said axis of rotation, said transfer gears constituting a gear train for interconnecting said one pair of planetary gears, wherein one of said one pair of side gears is smaller in diameter than the other and one of said planetary gears meshing with one of said side gears which has a larger diameter than the other and said even number of transfer gears are arranged on a same circumference, and the other of said planetary gears meshing with the other of said side gears which has a smaller diameter than the first-mentioned side gear are arranged on a circumference having a smaller diameter than the circle on which the first-mentioned planetary gear and said even number of transfer gears are arranged.

10. A parallel-axis gear differential according to claim 7, wherein said first and second pockets are formed in the inner peripheral surface of said housing.

11. A parallel-axis gear differential according to claim 8, wherein a partition portion for dividing the interior of said housing into one end side and the other end side is formed within said housing at an intermediate portion thereof in a direction of said axis of rotation, and portions of said first and second pockets corresponding to said partition portion are formed as holes, respectively.

12. A parallel-axis gear differential comprising:

a sleeve-like housing driven for rotation about an axis of rotation thereof;

one pair of side gears rotatable supported within said housing with a common axis thereof aligned with said axis of rotation;

at least one pair of planetary gears rotatably received in two first pockets formed within said housing in parallel with said axis of rotation and separated from each other in a circumferential direction of said housing and meshed with said one pair of side gears, respectively; and an even number of transfer gears rotatable received respectively in second pockets formed within said housing between said first pockets in parallel with said axis of rotation, said transfer gears constituting a gear train for interconnecting said one pair of planetary gears, wherein at least one of said one pair of planet gears is provided on opposite end Portions thereof with gear portions straddling a side gear with which the other Planetary gear is in meshing engagement, a gear portion on one end portion of said at least one planetary gear is in meshing engagement with said side gear and said transfer gear, and the other gear portion is in meshing engagement with said transfer gear, said one pair of planetary gears are arranged on a same circumference, and said even number of transfer gears are arranged on a same circumference having a larger diameter than a circle on which said one pair of planetary gears are arranged and said first pockets are formed in the inner peripheral surface of said housing and said second pockets are formed as a hole within said housing.

13. A parallel-axis gear differential comprising:

a sleeve-like housing driven for rotation about an axis of rotation thereof;

one pair of side gears rotatably supported within said housing with a common axis thereof aligned with said axis of rotation;

at least one pair of planetary gears rotatably received in two first pockets formed within said housing in parallel with said axis of rotation and separated from each other in a circumferential direction of said housing and meshed with said one pair of side gears, respectively; and an even number of transfer gears rotatably received respectively in second pockets formed within said housing between said first pockets in parallel with said axis of rotation, said transfer gears constituting a gear train for interconnecting said one pair of planetary gears;

wherein said side gears, said planetary gears and said transfer gears have helical teeth, and said teeth of said transfer gears are formed over the entire outer periphery of said transfer gears;

said one pair of planetary gears is arranged on a same circumference, and said even number of transfer gears is on a same circumference having a larger diameter than the circle on which said one pair of planetary gears are arranged;

said planetary gears and said transfer gears have a same length, and the opposite end surfaces of said planetary gears and said transfer gears are in contact with the end portions of said housing, respectively.

14. A parallel-axis gear differential according to claim 13 wherein said first and second pockets are formed in an inner peripheral surface of said housing.

15. A parallel-axis gear differential according to claim 14, wherein a partition portion for dividing the interior of said housing into one end side and the other end side is formed within said housing at an intermediate portion thereof in a direction of said axis of rotation, and portions of said first and second pockets corresponding to said partition portion are formed as holes, respectively.

16. A parallel-axis gear differential according to claim 13, wherein said first pockets are formed in the inner surface of said housing, and said second pockets are formed as a hole within said housing.

* * * * *

UNITED STATES PATENT AND TRADEMARK OFFICE
CERTIFICATE OF CORRECTION

PATENT NO. : 5,971,882
DATED : OCTOBER 26, 1999
INVENTOR(S) : MAKOTO NISHIJI

It is certified that error appears in the above-identified patent and that said Letters Patent is hereby corrected as shown below:

Col. 7, line 24, change "rotatable" to --rotatably--;

Col. 7, line 27, change "rotatable" to --rotatably--;

Col. 7, line 33, change "rotatable" to --rotatably--;

Col. 8, line 14, change "rotatable" to --rotatably--;

Col. 8, line 17, change "rotatable" to --rotatably--;

Col. 8, line 24, change "rotatable" to --rotatably--;

Col. 8, line 42, change "rotatable" to --rotatably--;

Col. 8, line 45, change "rotatable" to --rotatably--;

Col. 8, line 51, change "rotatable" to --rotatably--;

Col. 9, line 1, change "7" to --9--;

Col. 9, line 4, change "8" to --10--;

Col. 9, line 16, change "rotatable" to --rotatably--;

UNITED STATES PATENT AND TRADEMARK OFFICE
CERTIFICATE OF CORRECTION

PATENT NO. : 5,971,882
DATED : October 26, 199
INVENTOR(S) : MAKOTO NISHIJI

It is certified that error appears in the above-identified patent and that said Letters Patent is hereby corrected as shown below:

Col. 9, line 26, change "rotatable" to --rotatably--.

Signed and Sealed this

Eleventh Day of July, 2000

Attest:

Q. TODD DICKINSON

*Attesting Officer*            *Director of Patents and Trademarks*